United States Patent [19]

Schrader, Jr. et al.

[11] Patent Number: 4,731,235

[45] Date of Patent: Mar. 15, 1988

[54] METHOD OF MAKING SILICON NITRIDE

[75] Inventors: John L. Schrader, Jr., Towanda, Pa.; Patience G. Dowd, Albuquerque, N. Mex.

[73] Assignee: GTE Products Corporation, Stamford, Conn.

[21] Appl. No.: 687,885

[22] Filed: Dec. 31, 1984

[51] Int. Cl.$^4$ ............................................ C01B 21/068
[52] U.S. Cl. ...................................... 423/344; 423/406; 501/97
[58] Field of Search ................... 423/344, 406; 501/97

[56] References Cited

U.S. PATENT DOCUMENTS 3,839,541 10/1974 Lumby et al. ........................ 423/344
4,208,215 6/1980 Kleiner et al. ................... 423/344 X

FOREIGN PATENT DOCUMENTS 58-91016 5/1983 Japan ..................................... 423/344
2082161 3/1982 United Kingdom ................. 423/344

Primary Examiner—Jack Cooper
Attorney, Agent, or Firm—James Theodosopoulos

[57] ABSTRACT

In the manufacture of silicon nitride powder by the vapor phase reaction of a silicon halide with ammonia at an elevated temperature in a flowing system, oxygen content of the silicon nitride is controlled by preventing entry of room air into the reaction means and by feeding wet nitrogen into the system at about the exit end of the reaction means.

6 Claims, No Drawings

METHOD OF MAKING SILICON NITRIDE

This invention concerns the manufacture of silicon nitride powder by the vapor phase reaction of a silicon halide with ammonia at an elevated temperature, such as is disclosed in U.S. Pat. Nos. 4,416,863, 4,399,115, 4,145,224, 4,036,653 and 3,959,446. In a usual process, ammonia and silicon tetrachloride, in gaseous form, are introduced at a steady flow rate into one end of a reactor tube made, for example, of quartz. The gases flow through a hot zone, maintained at about 1000° to 1500° C., in the tube where reaction takes place. The reaction product exits the tube and is condensed and collected in powder form. The powder may then be heated to drive off ammonium chloride and crystallize the silicon nitride. The crystalline silicon nitride powder can then be formed into a usable product by pressing and sintering. For sintering purposes, it is desirable to control the oxygen content of the silicon nitride powder within a narrow range.

We have found that the oxygen content of the silicon nitride can be adequately controlled by preventing the entry of room air into the system, both at the entrance end and exit end of the reactor tube, and then introducing moisture into the system under controlled conditions. The moisture is introduced into the system by flowing nitrogen through water and thence into the system. We have found that the water-bearing nitrogen should be introduced into the system at about or after the exit end of the reactor tube, where the reaction product is in the imide form as silicon chloroimide or diimide, but before the collection means. When the water-bearing nitrogen is introduced into the entrance end of the reactor tube, sinterability of the silicon nitride powder is not as well enhanced.

For control purposes, we prefer to maintain the water at a constant temperature above room temperature. This is accomplished by keeping the water in an electrically heated container the temperature of which is controlled by a thermostat. If analysis of the crystalline silicon nitride shows too low an oxygen content, the rate of flow of the nitrogen through the water bottle is increased, and vice-versa for too high an oxygen content. In a typical case, the nitrogen flow rate was 1.5 cubic feet per hour and the oxygen content of the silicon nitride powder was controlled to 1.9% plus or minus 0.3% by weight.

We have found that in order to ensure that room air is kept out of the system, that the connector which connects the silicon halide and ammonia conduits to the entrance of the reactor tube should be covered with a nitrogen blanket. This is accomplished by surrounding the connector with a spaced apart collar and maintaining a flowing nitrogen atmosphere within the collar. A similar nitrogen blanket is provided at the exit end of the reactor tube.

We claim:

1. In the manufacture of silicon nitride powder by the vapor phase reaction of a silicon halide with ammonia at an elevated temperature in a system where the silicon halide and ammonia are introduced into the entrance end of a reactor tube, pass through a hot zone thereof where they react with each other to form a reaction product, and where the reaction product passes out of the reaction tube at the exit end thereof and thence to collection means where the reaction product is collected in powder form, the improvement which comprises introducing moisture into the system at a point between the exit end of the reactor tube and the collection means while preventing the entry of room air into the system, both at the entrance end and exit end of the reactor tube, the moisture being introduced into the system under controlled conditions by flowing nitrogen through water and thence into the system.

2. The process of claim 1 wherein the moisture is introduced into the system by means of a nitrogen carrier gas bubbled through water in a temperature controlled hot water container.

3. The process of claim 2 wherein the moisture is introduced into the system at a point where said reaction product is in imide form.

4. The process of claim 1 wherein the entrance and exit ends of the reactor tube are covered by a nitrogen blanket to prevent entry thereinto of room air.

5. The process of claim 4 wherein the silicon halide and ammonia flow into the reactor tube through a connector at the entrance end of the reactor tube and where there is a spaced apart collar surrounding the connector and said nitrogen blanket is maintained by a flowing nitrogen atmosphere within the collar.

6. The process of claim 5 wherein there are a similar connector, collar and flowing nitrogen atmosphere at the exit end of the reactor tube.

* * * * *